(12) United States Patent
Tsuchiya (10) Patent No.: US 7,050,896 B2
(45) Date of Patent: May 23, 2006

(54) CONTROL DEVICE FOR VEHICLE POWER STEERING

(75) Inventor: Yoshiaki Tsuchiya, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 119 days.

(21) Appl. No.: 10/901,334

(22) Filed: Jul. 29, 2004

(65) Prior Publication Data

US 2005/0049769 A1    Mar. 3, 2005

(30) Foreign Application Priority Data

Aug. 25, 2003 (JP) .............................. 2003-299493

(51) Int. Cl.
*B62D 6/00* (2006.01)

(52) U.S. Cl. ........................ 701/41; 180/443
(58) Field of Classification Search .................. None
See application file for complete search history.

(56) References Cited

U.S. PATENT DOCUMENTS 5,698,956 A * 12/1997 Nishino et al. ............. 318/432
6,768,283 B1 * 7/2004 Tanaka et al. ............... 318/632
2003/0074120 A1 * 4/2003 Kleinau ....................... 701/41
2004/0107032 A1 * 6/2004 Farrelly et al. .............. 701/42

FOREIGN PATENT DOCUMENTS

JP      B2 2568817     10/1996

* cited by examiner

*Primary Examiner*—Michael J. Zanelli
(74) *Attorney, Agent, or Firm*—Oliff & Berridge, PLC (57) ABSTRACT

A novel control device for a vehicle power steering apparatus or system is improved for providing preferable steering convergnecy even under the execution of VSC, while ensuring the steering smoothness under normal running conditions. In the control device, the target value of total modification torque to be added to steering torque through an power steering apparatus, is calculated based upon steering assist torque, calculated based upon at least steering torque; steering converging torque, based upon a steering velocity; and behavioral deterioration-suppressing torque for suppressing unwanted steering motions which would cause further deterioration of a vehicle behavior under oversteered or understeered conditions. In this calculation, when a predetermined condition is satisfied, the degree of contribution of the target value of the behavioral deterioration-suppressing torque to the target value of the total modification torque is rendered higher than the degree of contribution of the target value of the steering converging torque to the target value of the total modification torque.

11 Claims, 6 Drawing Sheets

CONTROL DEVICE FOR VEHICLE POWER STEERING

BACKGROUND OF THE INVENTION

1. Field of the Invention

The present invention relates to a device for controlling a power steering apparatus equipped on a vehicle such as an automobile, and more specifically, to such a device that controls torque and/or force, generated by a power steering apparatus, for assisting a driver's steering action and stabilizing the behavior of a vehicle.

2. Description of Prior Art

In a modern power steering system equipped on a vehicle, torque/force applied to steered wheels for assisting a steering action of a driver (steering assist torque) is controlled based upon parameters of running conditions of the vehicle, such as a vehicle speed. So far, in addition to the purpose of the reduction of torque required for rotating a steering wheel (steering torque), power steering systems and their control devices are variously designed so as to provide a driver with comfortableness and safety in driving a vehicle.

In some of power steering systems, torque controlled to be increased/decreased in the direction opposite to the rotational velocity of a steering wheel (the rate of changing the steering angle of steered wheels) is provided to the steering mechanism for steered wheels, as well as steering assist torque depending upon steering torque. This torque, often called as "damping control torque" or "steering converging torque", suppresses the inertial rotation or angular momentum of the steering wheel, improving "steering convergency", i.e. performance of controlling a steering angle against the overshooting and/or fluctuation of the steering system, or stabilizing the angular position of the steering system, to prevent a vehicle body from staggering left and right upon the rotating or releasing of the steering wheel. Examples of Electric Power Steering (EPS) systems, designed to generate such damping control torque, are seen in Japanese Patent No. 2568817 and Japanese Patent Laid-Open Publication No. 63-291769. In these publications, an input current value for an electrical motor moving a rack in a rack-pinion mechanism is determined based upon a sum of target steering assist torque value and target damping control torque value, calculated as functions of steering torque and steering angular velocity, respectively, and optimized with a vehicle velocity. Because of the improvement of the steering convergency through the application of damping control torque, the vehicle traveling direction is smoothly settled, thereby improving the straight-line stability in a running vehicle.

Excessive damping control torque, however, would deteriorate the smoothness in the rotating of the steering wheel. If steering torque required for rotating a steering wheel is excessively increased due to the exertion of the damping control torque, the driver would feel that her handle is too heavy when a driver intends to rotate a steering wheel relatively quickly and/or continuously. Thus, for the comfortableness in driving and/or steering a vehicle, the damping control torque should be controlled while taking into account driver's handling operation.

By the way, when a vehicle behavior is fallen into deteriorated conditions, i.e. oversteering (spinning) conditions or understeering (drifting-out) conditions, rather strong reciprocal yawing motions of a vehicle body would render steered wheels and a steering wheel instable, highly deteriorating the steering convergency. Although Vehicle Stability Control (VSC), if equipped on the vehicle, is executed to generate "anti-spin" or "anti-drift-out" yaw moment for suppressing the unwanted yawing motions, VSC would be less effective if the angular position of the steered wheels is liable to fluctuate. Rather, unwanted steering motions due to strong road reaction or panicky steering action of a driver would cause further deterioration of a vehicle behavior under oversteered or understeered conditions. In order to recover the steering convergency under such deteriorated conditions of a vehicle behavior, it is required to generate large torque on the steered wheels against their unwanted rotation, which torque, however, is excessive for damping control torque under normal running conditions in which the steering smoothness is required.

In conventional controlling strategies for damping control torque so far, the requirement of larger torque for recovering steering convergency upon deterioration of a vehicle behavior is less considered. Thus, control devices for power steering systems may be improved more appropriately in conjunction with control of torque for steering convergence, especially upon deterioration of a vehicle behavior. In such control devices, the steering smoothness should be also ensured under normal running conditions.

SUMMARY OF INVENTION

According to the present invention, there is provided a novel control device for a vehicle power steering apparatus or system, improved for providing preferable steering convergnecy, irrespective of whether or not a vehicle behavior is fallen into deteriorated conditions or even under the execution of VSC, while ensuring the steering smoothness under normal running conditions (the behavior of a vehicle is not deteriorated).

The vehicle, provided with the inventive control device, has a steering wheel (a steering handle), steered wheels, a power steering apparatus steering the steered wheels to a steering angle determined by rotating the steering wheel, and at least one sensor monitoring a vehicle behavioral condition. The power steering apparatus exerts torque on the steered wheels for controlling its steering angle in accordance with a target value determined by the inventive control device, together with the steering torque exerted on the steering wheel by a driver. The target value of total modification torque (TMT), total torque to be added to the steering torque through the power steering apparatus, is calculated based upon at least three target torque components: steering assist torque (SAT), calculated based upon at least steering torque; steering converging torque (SCT), based upon at least a steering velocity (the changing rate of the steering angle); and behavioral deterioration-suppressing torque (BDST) for suppressing unwanted steering motions.

As noted, in the conventional system, countermeasures are rarely taken against the deterioration of the steering convergency due to the oversteering and/or understeering of a vehicle. In the inventive device, however, BDST is exerted on the steered wheel through the power steering apparatus for recovering and/or maintaining the desirable steering convergency even when the vehicle behavior is fallen into the deteriorated conditions. Then, by suppressing or eliminating the unwanted fluctuation of the steering angle of the steered wheels through the exertion of BDST, the action of the VSC for suppressing behavioral deterioration will be made more effective. Further, since, in usual, torque required for sufficiently suppressing unwanted steering motions during the oversteering and/or understeering is excessive for SCT under normal conditions, the degree of contribution of the target value of BDST to the target value of TMT is rendered higher than the degree of contribution of the target value of SCT to the target value of the TMT only when a predetermined condition is satisfied, thereby ensuring the smoothness in the rotation of the steering wheel by a driver. Thus, the magnitude of a target BDST value may be set larger than the magnitude of a target SCT value.

In order to exert BDST at an appropriate timing while taking into account that BDST will reduce the steering smoothness, the predetermined condition for the starting of increasing the contribution of BDST to the TMT is judged satisfied when an indication value indicating a degree of behavior deterioration of the vehicle exceeds a reference value. For such an indication value, more specifically, an indication value indicating a degree of oversteered condition or understeered condition of the vehicle may be advantageously used. As known in the art, the ways of judging behavioral conditions of a vehicle have been successfully developed in conjunction with VSC. Thus, such criteria used in VSC may be advantageously used for applying BDST only when unwanted fluctuation of a steering angle in conjunction with behavioral deterioration is liable to occur, while maintaining the steering smoothness under normal conditions. For instance, the indication value useful for the purpose described above may be a deviation of an actual yaw rate from the corresponding target yaw rate of a vehicle body.

Upon judging if the predetermined condition is satisfied, preferably, a vehicle speed is also referred to. The possibility of deterioration of steering convergnecy due to behavioral deterioration is relatively low when a vehicle speed is low. Thus, in order to avoid applying BDST under conditions that its requirement is low, the predetermined condition may be judged satisfied when the indication value exceeds the reference value only under conditions that a vehicle speed exceeds a speed reference value, thereby preventing BDST from erroneously reducing the steering smoothness. However, conditions where BDST is really required should be corrected more quickly, as compared with condition where SCT is required. Thus, BDST may be applied at a lower vehicle speed than SCT if the predetermined condition is satisfied.

Further, it is desirable to exert BDST before the behavior of a vehicle has been highly deteriorated where higher torque would be required for correcting the steering convergency. Thus, preferably, the reference value for the indication value is set such that the indication value exceeds the reference value simultaneously with or prior to the starting of behavioral control through controlling braking and driving force on wheels of the vehicle.

On the other hand, even when the predetermined condition is turned unsatisfied, preferably, the degree of contribution of a target value of BDST to a target value of TMT is kept higher than the degree of contribution of a target value of SCT to the target value of TMT for a predetermined period. Under certain conditions, for example, it is possible that a vehicle behavior is alternatively transited between an oversteered condition and an understeered condition or between oversteered conditions on the opposite sides (left and right). In those cases, the predetermined condition set for increasing the contribution of BDST can be instantaneously or temporally turned unsatisfied, though BDST is not to be interrupted. Thus, the high contribution of BDST may be maintained as described.

In one embodiment, a target TMT is calculated based upon target values of SAT and SCT when the predetermined condition is not satisfied while a target TMT is calculated based upon target values of SAT and BDST when the predetermined condition is satisfied. In another embodiment, a target TMT may be calculated based upon SAT and a weighted sum of SCT and BDST, where the weight for BDST may be increased, relative to the weight for SCT, with the increase of an indication value of behavioral deterioration, resulting in smooth transition between BDST and SCT.

A target value of SCT may be calculated as a function of a steering velocity and a vehicle speed. As noted, SCT should be generated in the direction opposite to a steering velocity while the magnitude of SCT is increased together with the vehicle speed. In addition, for ensuring the steering smoothness under normal running conditions, the magnitude of SCT may be decreased with the increase of the magnitude of the steering torque generated through the rotation of a steering wheel by a driver. If the steering torque value exceeds a certain value, SCT may be nullified.

A target value of BDST may be calculated also based upon a steering velocity and a vehicle speed. Preferably, BDST will be also generated in the direction opposite to the steering velocity, and the magnitude of the target BDST value when the magnitude of the steering velocity is high is calculated to be rendered larger than when the steering velocity is lower. Thus, BDST will be varied in response to the steering rotation to be suppressed, thereby ceasing unwanted overshooting and fluctuation of the steering angle of steered wheels and a steering wheel. In addition, preferably, the magnitude of the target BDST value when the vehicle speed is high is calculated to be rendered larger than when the vehicle is lower, because the degrees of the steering overshooting and fluctuation are liable to become larger with the increase of the vehicle speed. However, upon deterioration of a vehicle behavior, since the vehicle behavior should be corrected as soon as possible, the steering convergency is considered in preference to the steering smoothness. Thus, BDST may not be varied with the steering torque.

Thus, it is an object of the present invention to provide new and novel control devices of power steering apparatus or system for a vehicle such as automobile, which devices exert torque for suppressing the deterioration of steering convergency due to deterioration of a vehicle behavior.

It is another object of the present invention to provide such devices wherein the smoothness of steering under normal running conditions is ensured.

It is a further object of the present invention to provide such devices wherein, through recovering and maintaining desirable steering convergency during the execution of VSC, behavioral deterioration of a vehicle, such as oversteering and understeering is more effectively suppressed.

It is a further object of the present invention to provide such devices that control contributions of steering converging torque and behavioral deterioration suppressing torque to total modification torque, depending upon the degree of deterioration of a vehicle behavior and thereby providing desirable steering convergency while ensuring the steering smoothness under normal running conditions.

It is another object of the present invention to provide such devices exerting damping control torque enough to suppress the overshooting and fluctuation of the steering angle of steered wheels even when a vehicle behavior is fallen into deteriorated conditions.

It is another object of the present invention to provide such devices wherein damping control torque exerted when a vehicle behavior is deteriorated is determined based upon a steering velocity and a vehicle speed while the steering convergency is considered in preference to the steering smoothness.

Other objects and advantages of the present invention will be in part apparent and in part pointed out hereinafter.

BRIEF DESCRIPTION OF THE DRAWINGS

In the accompanying drawings.

DESCRIPTION OF PREFERRED EMBODIMENTS

Figure 1:
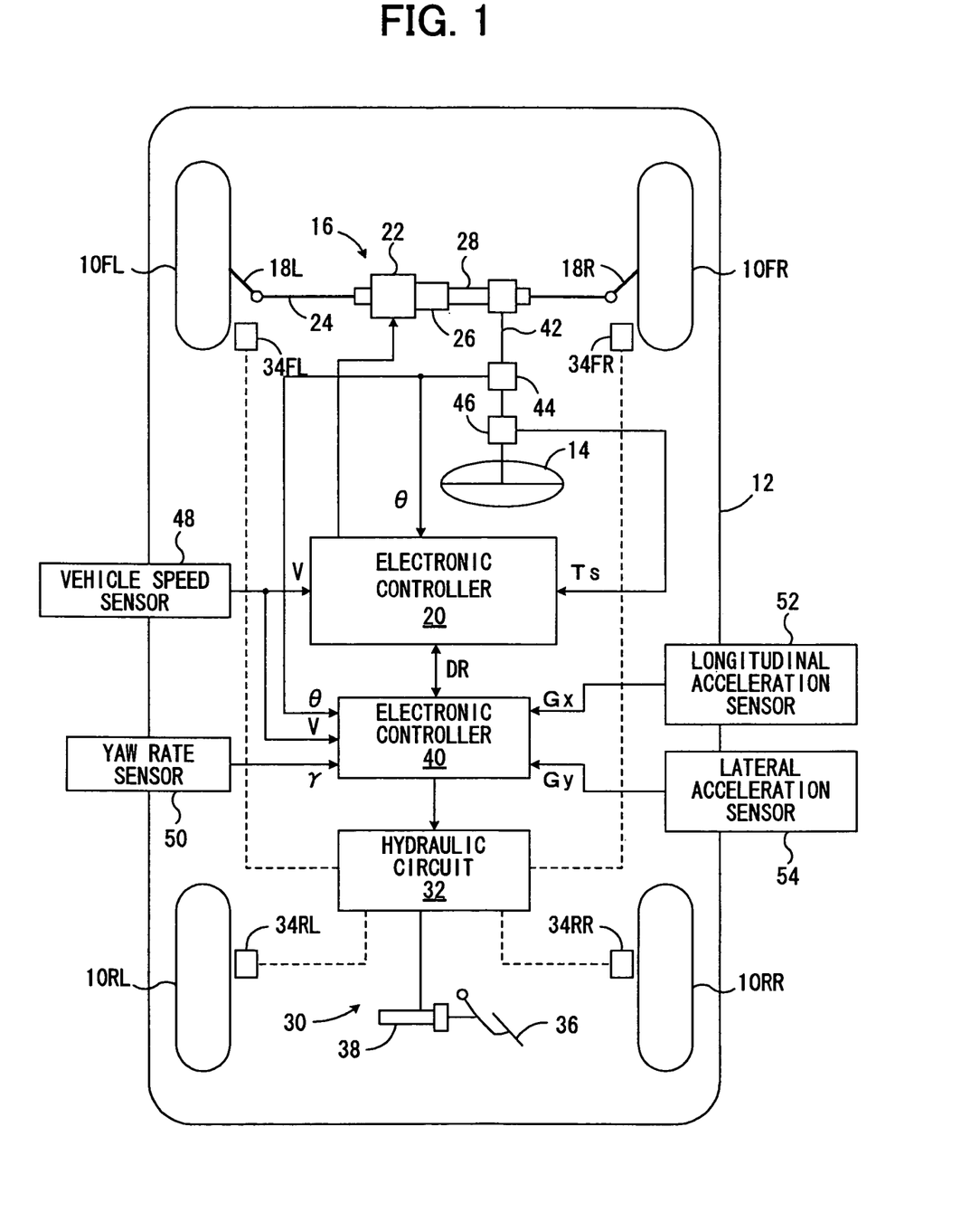
FIG. 1 is a diagrammatical view of one embodiment of a four wheeled, rear drive vehicle incorporating a control device for a vehicle power steering apparatus, controlling steering modification torque according to the present invention.

FIG. 1 diagrammatically shows one embodiment of a control device for electrical power steering (EPS) apparatus according to the present invention, equipped on a four-wheel, rear drive vehicle (for clarity of the drawing, omitted are most components irrelevant to the operation of the inventive control device for EPS apparatus.). In this connection, it will be readily understood from the explanation described below that a vehicle incorporating the inventive control device may be a four-wheel, front drive vehicle or a four-wheel drive vehicle.

The vehicle includes a vehicle body 12, front right wheel 10FR, front left wheel 10FL, rear right wheel 10RR and rear left wheel 10RL supporting the vehicle body 12 via the respective suspension means (not shown in the figure). As usual, the vehicle is also provided with an engine adapted to output a driving torque according to a throttle valve opening in response to the depression of an acceleration pedal by the driver, a hydraulic torque converter and an automatic transmission transmitting a rotational driving force from the engine to the rear wheels 10FL, FR through a differential gear system (not shown) and driving shafts.

A brake system generally designated by 30 includes a hydraulic circuit 32, a brake pedal 36 adapted to be depressed by the driver, a master cylinder 38 for supplying a master cylinder pressure to the hydraulic circuit means 32 according to the depression of the brake pedal by the driver, and wheel cylinders 34$i$ (i=FL, FR, RL, RR) each adapted to apply a braking force to each corresponding one of the front right, front left, rear right and rear left wheels 10$i$ according to a supply of a hydraulic pressure thereto from the hydraulic circuit 22. The hydraulic circuit 32 also has connection with an oil reservoir, an oil pump, etc. and various valves. As known in the art, each wheel cylinder can be exposed to a high pressure region (the output of the oil pump) and a low pressure region (the oil reservoir) through a pair of pressure control valves, one for the high pressure side and the other for the low pressure side. Thus, braking pressures in the wheel cylinders, i.e. braking force on the individual wheels can be changed independently of one another by opening or closing the respective pairs of the individual pressure control valves. When the vehicle behavior is fallen into oversteered or understeered conditions, yaw moment will be generated for suppressing the unwanted motion of the vehicle body by individually adjusting the braking pressures in the wheel cylinders 34$i$ under control of Controller 40 (VSC) as described below.

The front right and front left wheels 10FR, FL are steered, via a pair of tie rods 18R, 18L, by an EPS apparatus 16 of a rack-and-pinion type according to a rotation of a steering wheel 14 by a driver. The EPS apparatus 16 may be of a rack assist type, in which reciprocal force converted from rotational torque of an electric motor 22 by a ball and screw type converter apparatus 26 is added into reciprocal force for a rack bar 24 relative to a housing 28, derived from the rotation of the steering wheel 14. The rotational torque generated by the motor 22 (steering total modification torque, TMT), which is a sum of steering assist torque (SAT) plus damping control torque (DCT), i.e. steering converging torque (SCT) and/or behavioral deterioration suppressing torque (BDST), is regulated under the control of an electronic controller 20.

The electronic controllers 20 and 40 each may be of an ordinary type including a central processor unit, a read only memory, a random access memory, input and output port means and a common bus interconnecting these elements (not shown), and communicate to each other through appropriate signal lines.

As noted, the controller 40 functions as a VSC device. To the controller 40, fed are, for example, signal indicating steering angle θ detected with a steering angle sensor 44 mounted on a steering shaft attached to the steering wheel 14; and signals of vehicle (body) speed V yaw rate γ, a longitudinal acceleration Gx, a lateral acceleration Gy, from the respective sensors 48, 50, 52 and 54. In addition to the above sensors, any other appropriate sensors may be provided for monitoring conditions of the vehicle behavior. The controller 40, for example, first calculates indication values such as a drift state value, a spin state value, etc. indicating the degree of a vehicle behavioral deterioration based upon the above-listed parameters (signals). Then, in accordance with those state values, the controller 40 operates the hydraulic braking circuit 32 for generating "anti-spin" and/or "anti-drift-out" yaw moment through adjusting the distribution among the barking force on individual wheels. It should be noted that, for a control strategy of VSC, any conventional ways may be used. Further, in the present embodiment, a drift state value, DR, (or parameters used for calculating the drift state value) is fed to the controller 20 for controlling the TMT generated with the motor.

The controller 20 functions as a control device for the EPS apparatus. To the controller 20, fed are at least a signal of a rotational angle θ of the steering wheel 14 from an angular sensor 44 mounted on a steering shaft; a signal of steering torque Ts from a torque sensor 46 also mounted on the steering wheel 14; a signal of a vehicle speed V from a vehicle speed sensor 48; and a signal of an indication value indicating the vehicle behavior, such as Drift state value, DR from the controller 40 (DR may be calculated in the controller 20, by receiving required parameters from the controller 40). Based upon the data of those signal, the controller 20 determines a target value of TMT to be added to the rack bar 24 together with steering torque by a driver and then operates the motor 22.

As described above, one of the features in the present invention is in that BDST is started to be exerted or increased when a predetermined condition is satisfied. In the present embodiment, the contribution of BDST is increased when a drift state value DR, and a vehicle speed V each exceed the respective values DR1 and V1, namely, when the vehicle behavior is fallen into deteriorated conditions at a vehicle speed above V1. Although BDST may be considered as damping control torque (DCT) exerted against the rotation of the steered wheels and steering wheel (the variation of the steering angle), like SCT, the characteristics of BDST are quite different from SCT. Firstly, (the magnitude of) SCT is reduced as the steering torque increases for ensuring the steering smoothness while BDST is independent upon the steering torque. This is because, under conditions that a vehicle behavior is deteriorated, the steering convergency should be corrected in preference to the steering smoothness for safety of the vehicle. Secondly, the magnitude of BDST should be quite larger than that of SCT, because force/torque making the angle of steered wheels fluctuating, exerted from road reaction force and inertial (centrifugal) force, becomes quite larger when a vehicle behavior is fallen into deteriorated conditions such as spinning and drifting-out. Other features to be noted in the control of BDST and SCT in the present invention are pointed out in the following explanation in conjunction with an exemplary flowcharts as shown below.

Figure 2:
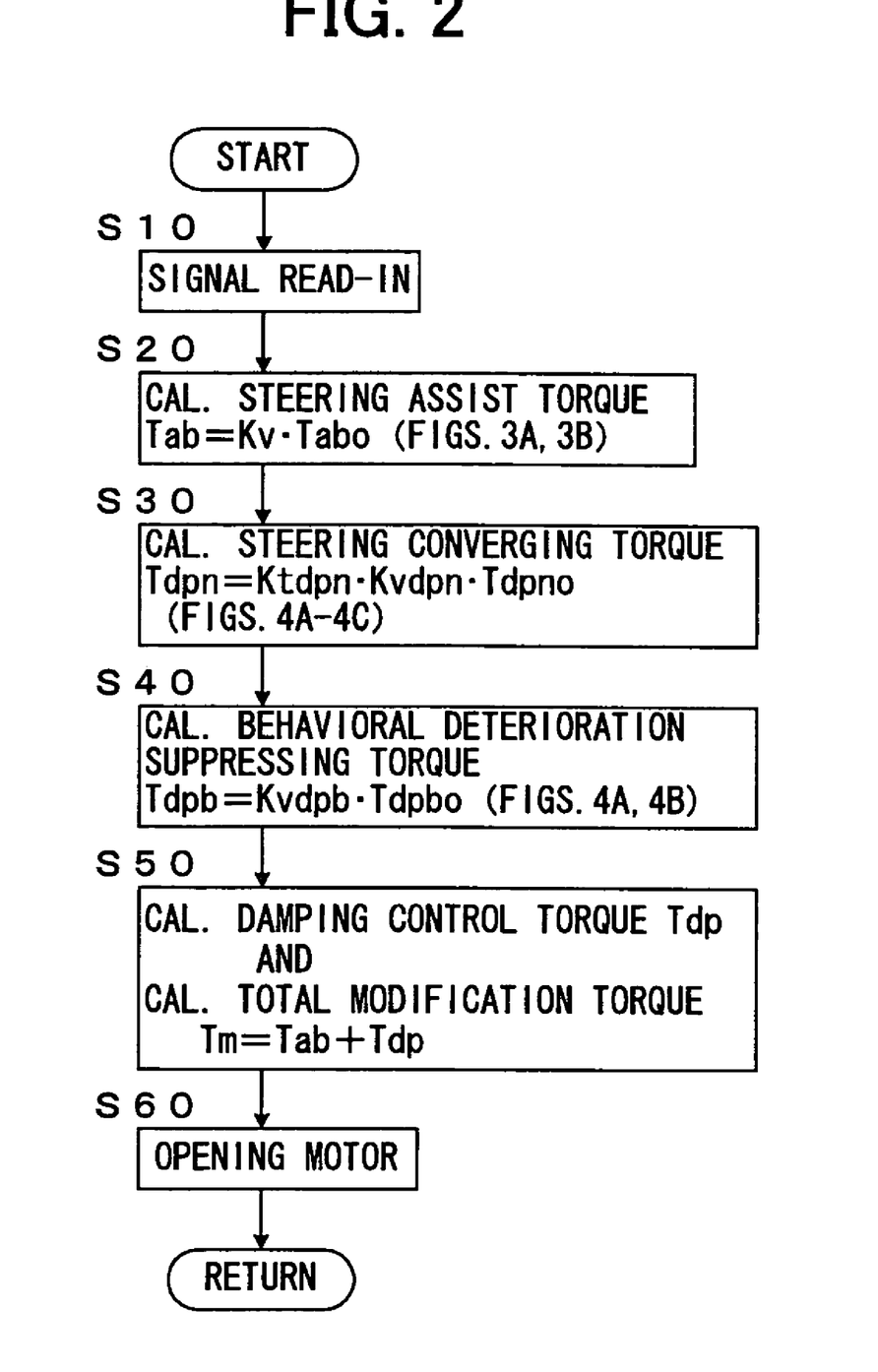
FIG. 2 is a flowchart showing a main routine of controlling steering modification torque to be generated by a motor, executed in a preferred embodiment in FIG. 1 according to the present invention.

The control main routine in the flowchart of FIG. 2 is executed in the controller 20 in FIG. 1, which routine may be started by a closure of an ignition switch (not shown in FIG. 1) and cyclically repeated at a cycle time such as several milliseconds to several tens of milliseconds during the operation of the vehicle. In the following processes, a steering angle θ, measured on the steering wheel, and its velocity or rate dθ, a yaw rate γ, steering torque Ts, SAT Ta, DCT Tdp, SCT Tdpn, BDST Tdpb. and a drift state value DR in the rightward direction are defined as positive. A vehicle speed in the forward direction is defined as positive.

Firstly, in step 10, the signals shown in FIG. 1 and Drift state value DR are read in.

Drift state value DR may be determined in an appropriate way known in the art by the controller 40, using vehicle speed V and yaw rate γ, monitored with the respective sensors. For instance, the drift state value DR may be determined as follows:

$$DR = \gamma t - \gamma \quad (1)$$

where γt is a standard yaw rate, determined as follows:

$$\gamma t = V \cdot \delta / \{(1 + Kh \cdot V^2) \cdot H \cdot (1 + \tau \cdot s)\} \quad (2)$$

where δ is a steering angle determined based upon a steering wheel angle θ; Kh, a stability factor; H, the length of a wheel base; τ and s, a time constant and a frequency parameter of Laplace transformation. This drift value DR is the deviation of an actual yaw rate from an expected yaw rate (standard yaw rate), indicating that a vehicle, turning rightward, falls into understeer condition when DR>0. As the degree of deterioration of a vehicle running condition (yaw attitude of the vehicle body) gets worse, the magnitude of DR increases. Further details are described elsewhere. It should be noted that, for an indication value of vehicle behavioral deterioration, spin value as known for indicating spinning condition may be sent to and used in the controller 20, instead of or together with DR.

Figure 3A:
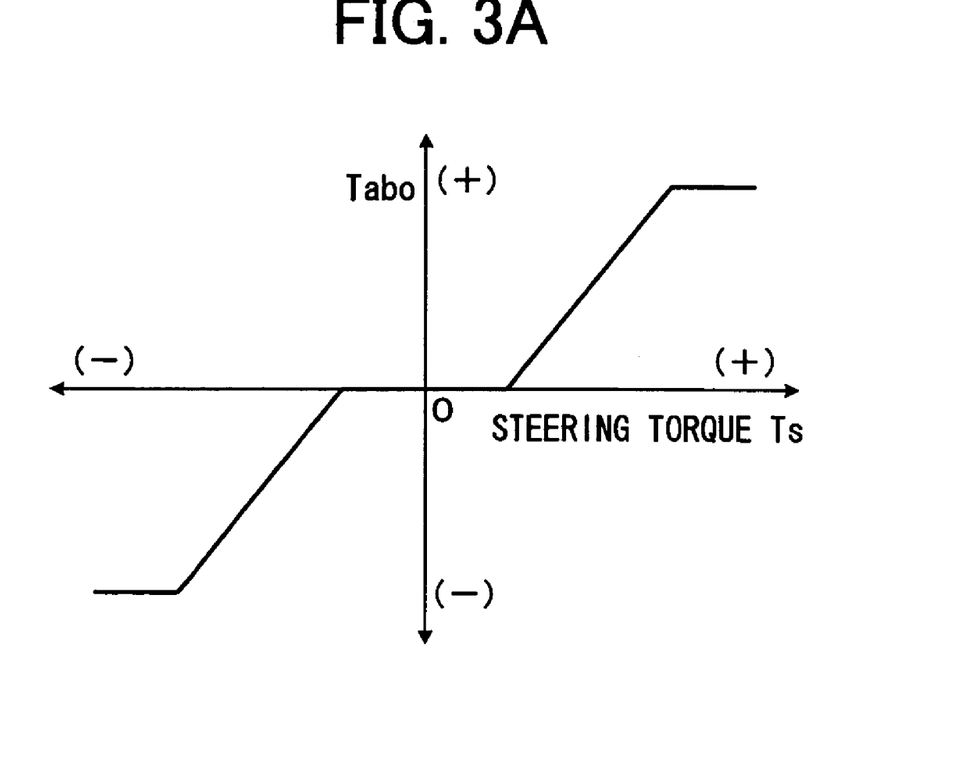
FIGS. 3A and 3B each shows maps of primitive steering assist torque vs. steering torque, and a factor correcting the primitive steering assist torque vs. a vehicle speed, used in step 20 of the flowchart of FIG. 2.
Figure 3B:
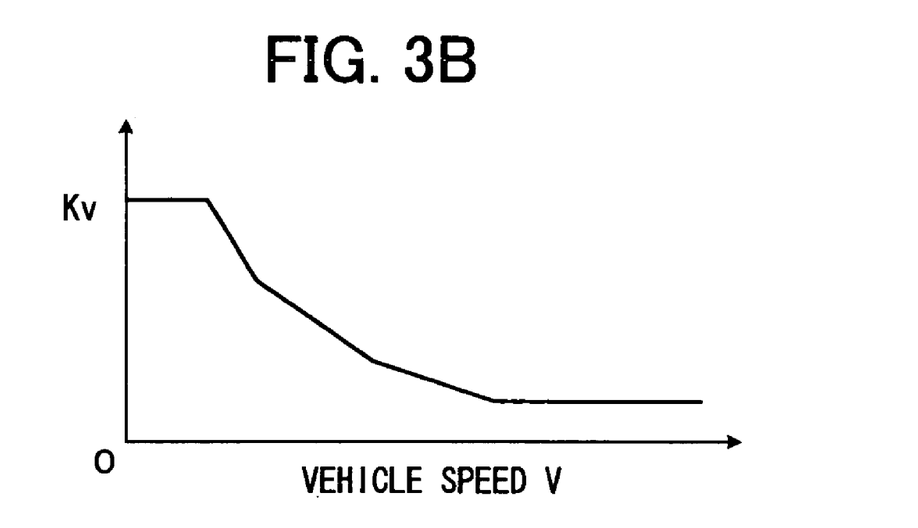

Then, in step 20, there is calculated a target value of SAT Tab as follows:

$$Tab = Kv \cdot Tabo \quad (3)$$

where Tabo is a primitive SAT determined as a function of steering torque. Ts, using a map in FIG. 3A; and Kv, a correction factor with respect to a vehicle speed V, determined using a map in FIG. 3B. As seen from the maps, Tab is increased with steering torque Ts, and decreased with a vehicle speed V, and accordingly, torque required for rotating the steering wheel is lighten by adding SAT as auxiliary steering force to the rack bar 24 in the same direction as the steering torque Ts. It should be noted that this SAT Tab is always incorporated in TMT. SAT may be determined in the other appropriate ways known in the art.

Figure 4A:
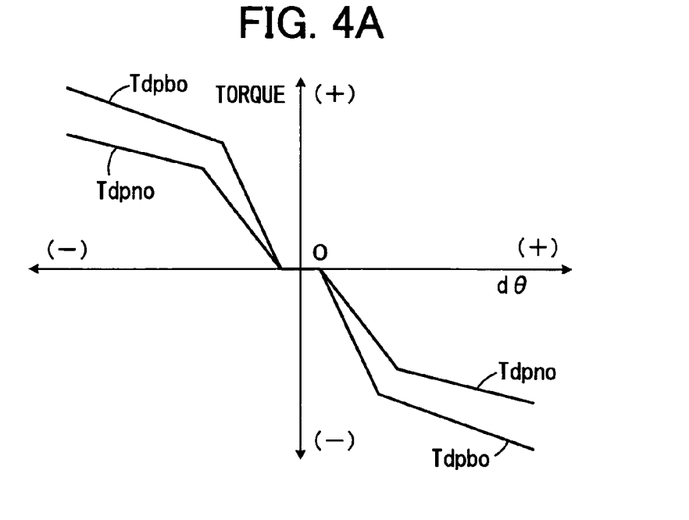
FIG. 4A shows maps of primitive steering converging torque Tdpno and primitive behavioral deterioration suppressing torque Tdpbo vs. steering velocity dθ, used in steps 30 and 40, respectively, of the flowchart of Fog. 2.

Then, in step 30, calculated is a target value of damping control torque under normal conditions, i.e. SCT, Tdpn as follows:

$$Tdpn = Ktdpn \cdot Kvdpn \cdot Tdpno \quad (4)$$

where Tdpno is a primitive SCT determined as a function of steering velocity dθ, using a map as indicated by a line Tdpno in FIG. 4A; Kvdpn, a correction factor with respect to a vehicle speed V, determined using a map as indicated by a line Kvdpn in FIG. 4B; and Ktdpn, a correction factor with respect to the steering torque Ts using a map in FIG. 4C.

As seen from the expression (4) and the map in FIG. 4A, as the steering velocity dθ becomes fast, SCT will increases in the opposite direction of the steering velocity dθ. That is, SCT serves to cease the rotation of the steering wheel (to cancel the inertial motion of the steering system), suppressing overshooting and fluctuation of the steering. Usually, road reaction force generated on the steered wheels is always directed toward the steering neutral position, θ=0. Thus, through the exertion of SCT, the steering position is quickly settled in the neutral position when a driver releases the steering wheel from his hand (the steering torque=0) with no, or significantly reduced, overshooting and fluctuating. In other words, the straight-line stability in a running vehicle will be improved.

Figure 4B:
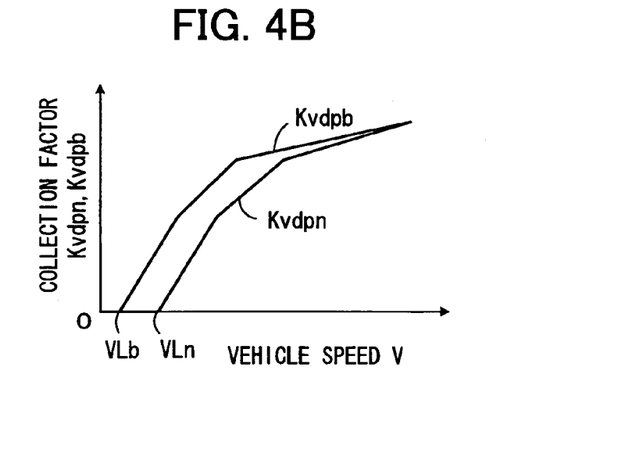
FIG. 4B shows maps of correction factors, Kvdpn and Kvdpb with respect to a vehicle speed, used in steps 30 and 40, respectively, of the flowchart of Fog. 2.

Further, the overshooting and/or fluctuation amplitude of the steering position is increased with a vehicle speed. Thus, Tdpn is also increased with a vehicle speed as seen from the map of FIG. 4B, for suppressing the increased unwanted steering motions. As shown in FIG. 4B, Kvdpn=0, when a vehicle speed is in the low range below Vln. This is because the steering overshooting and/or fluctuation is not significant in the low speed range.

Figure 4C:
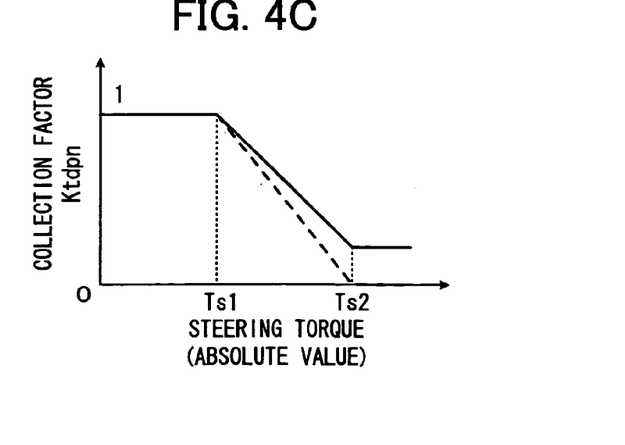
FIG. 4C shows a map of a correction factor, Ktdpn with respect to steering torque Ts, used in step 30 of the flowchart of FIG. 2.

In addition, the magnitude of SCT is reduced as the steering torque increases, as seen from the map of FIG. 4C, for ensuring the steering smoothness under normal running conditions. The steering torque Ts reflects a driver's intention of rotating the steering wheel. Thus, through the reduction of SCT, i.e. torque against the rotation of the steering wheel, the driver is allowed to rotate the steering wheel with smaller torque. As seen from FIG. 4C, Ktdpn may be set to start decreasing from 1 to a lower value (solid line) as the steering torque increases after it exceeds a certain reference value Ts1. The lower value may be 0 as shown by the broken line. In this case, Tdpn will become zero when the steering torque exceeds another reference value Ts2.

Returning to FIG. 2, in Step 40, calculated is a target value of damping control torque when the vehicle behavior is deteriorated, i.e. BDST, Tdpb as follows:

$$Tdpb = Kvdpb \cdot Tdpbo \qquad (5)$$

where Tdpbo is a primitive BDST determined as a function of steering velocity dθ, using a map as indicated by a line Tdpbo in FIG. 4A; and Kvdpb, a correction factor with respect to a vehicle speed V, determined using a map as indicated by a line Kvdpb in FIG. 4B.

As seen from the expression (5) and FIG. 4A, although the dependence of Tdpb upon the steering velocity dθ and vehicle speed V is similar to Tdpn, the value (magnitude) of Tdpb itself is set to be significantly larger than Tdpn (Tdpc may be discontinuously increased although, as described below, the transition between Tdpb and Tdpn will be performed gradually.), and Tdpb is not dependent upon the steering torque Ts. This is because, as described above, the unwanted force/torque making the angle of steered wheels fluctuating becomes quite larger and the steering convergency is corrected in preference to the steering smoothness in order to stabilize the vehicle behavior as much as possible. Further, as seen from FIG. 4B, Tdpb is started to increase at lower speed than Tdpn (the lower limit Vlb for Kvdpb is lower than Vln for Kvdpn). This is because, when a vehicle behavior is deteriorated, the steering motion should be ceased as soon as possible before the deterioration would be increased, irrespective of a vehicle speed.

BDST cooperates with VSC for effectively suppressing a vehicle behavioral deterioration. For instance, when a vehicle is fallen into spinning condition, VSC generates a certain amplitude of anti-spinning moment on the vehicle body repetitively until the spinning is ceased. During this VSC operation, however, if the steering position fluctuates, it is possible that the vehicle body starts staggering left and right (the vehicle is alternatively fallen into oversteered conditions in the opposite sides), causing control hunting. In another case, when a vehicle is understeered, where tire force of the front, steered wheels is saturated, the torque required to rotate steering wheel is undesirably reduced, inducing its excessive rotation. In this case, VSC decreases the vehicle speed, recovering the gripping force of the tires on the front wheels. However, when the tire force on the front wheels is recovered, excessive turning would be induced if the steering angle has been excessively increased, whereby the tire force on the rear wheels would be made saturated and the vehicle would become oversteered. Such phenomena due to steering and behavioral instability can be avoided or reduced by suppressing unwanted steering motions through exerting BDST, i.e. strong damping control torque, and thus the behavioral deterioration will be effectively corrected through VSC.

Returning to FIG. 2 again, in step 50, the degrees of contributions of BDST and SCT to TMT are determined, and accordingly, TMT is determined.

Figure 5:
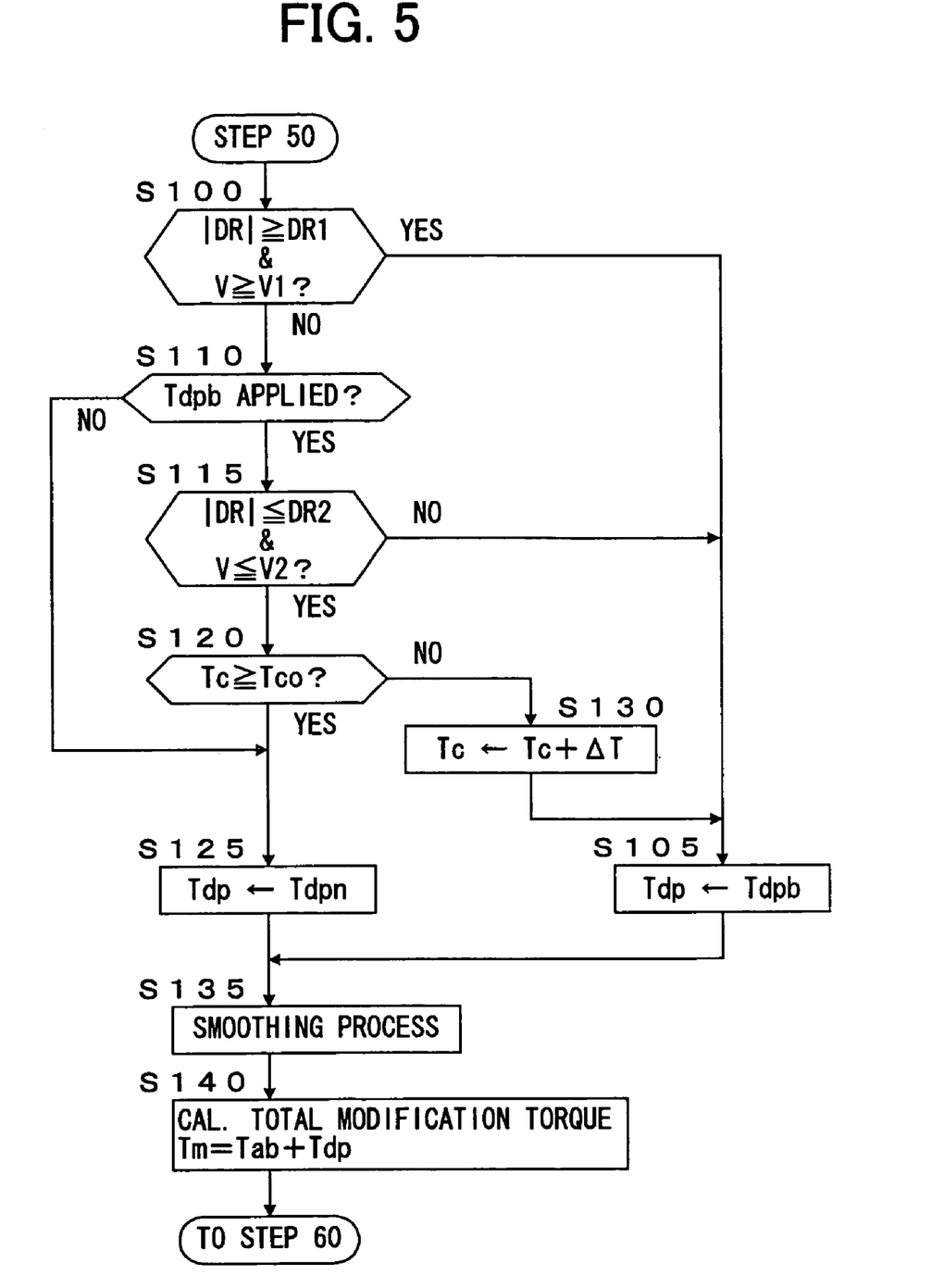
FIG. 5 is a flowchart of a first embodiment of Step 50 of the flowchart of FIG. 2, where damping control torque Tdp is selected from Tdpn and Tdpn, depending upon vehicle behavioral conditions, and the total steering modification torque Tm are calculated.

In one embodiment, basically, total DCT, Tdp, is set to SCT, Tdpn under normal conditions and to BDST, Tdpb, under deteriorated conditions. Referring to FIG. 5 showing the flow in step 50, first, it is judged in Step 100 if the following condition is satisfied:

$$|DR| \geq DR1 \text{ and } V \geq V1 \qquad (6)$$

where DR1, V1 are appropriately determined positive reference values for DR and V, respectively. In order to prevent the steering convergency from being deteriorated due to the behavioral deterioration, DR1 and V1 is set such that BDST has been started to be applied when VSC is executed. Thus, DR1 and V1 may be equal to or slightly smaller than the corresponding reference values for VSC.

When this condition is satisfied, the vehicle behavior is deteriorated so that Tdp is set to Tdpb (Step 105). On the other hand, under normal conditions (when the condition (6) is not satisfied), Tdp is set to Tdpn in Step 125 through Step 110 (it is judged if BDST has been exerted in the previous cycle) while bypassing Steps 115 and 120.

Once the vehicle behavior is judged as deteriorated, BDST should be continuously applied until the behavioral condition turns into a normal condition. However, the magnitude of drift state value |DR| can decrease temporally or instantaneously when the transition of the vehicle behavior between understeered and oversteered conditions or between left and right oversteered conditions occurs. Thus, in order to avoid an interruption of BDST due to such a temporal reduction of DR, the application of BDST is continued for a predetermined period, e.g. for one second, after the predetermined condition is turned unsatisfied or |DR| and V each are reduced to levels where BDST is no longer required.

In a cycle after the staring of application of BDST, if the condition (6) is not satisfied, it is judged in Step 110 that BDST has been exerted. Then, in Step 115, it is judged if the following condition is satisfied:

$$|DR| \leq DR2 \text{ and } V \leq V2 \qquad (7)$$

where DR2 and V2 each are appropriately determined positive reference values for DR and V, smaller than D1 and V1 for avoiding control hunting. If not, the application of BDST will be continued (in Step 105).

If the condition (7) is satisfied, it is checked if the elapsed time Tc after the condition (7) is satisfied reaches to the predetermined period Tco: if Tc≧Tco in Step 120 (Tc is 0 before the condition (7) is satisfied). Then, if not, Tc is incremented by ΔT in Step 130 and the application of BDST will be continued (in Step 105). When the condition (7) is kept satisfied for Tco after a plurality of cycles, it is judged that the behavioral condition is turned into a normal condition and Tdp is set to Tdpn (Step 125).

After the setting of Tdp to either of Tdpn and Tdpb (Step 105 or 125), a process for smoothing the variation of Tdp in Step 135 is executed, where Tdp is modified so as to smooth out a large variation of DCT, if any, because of the switching between Tdpb and Tdpn. This smoothing processing may be done in any way as known in the art.

Then, in step 140, a target value of TMT, Tm, is calculated as follows:

$$Tm = Tab + Tdp \qquad (8)$$

where Tdp=Tdpn under normal conditions and; Tdp=Tdpb under deteriorated conditions (modified in Step 135).

Accordingly, since DCT is appropriately selected from SCT and BDST, deterioration of the steering convergency, induced from and increasing behavioral deterioration, is suppressed while ensuring the steering smoothness under normal conditions.

Figure 6A:
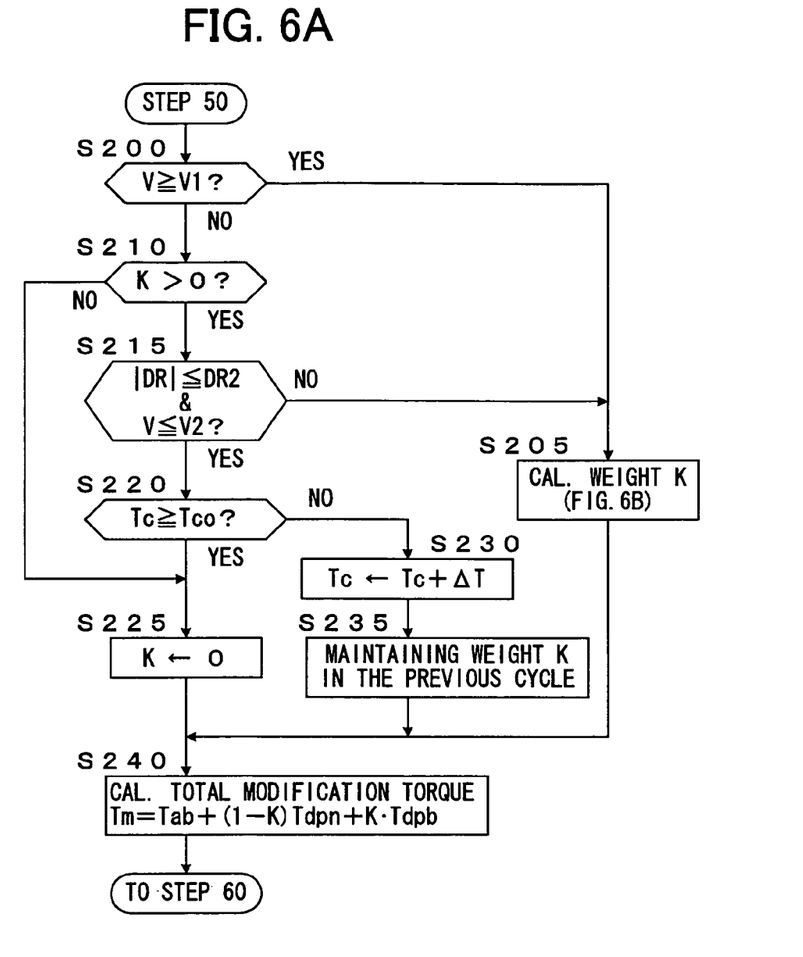
FIG. 6A is a flowchart of a second embodiment of Step 50 of the flowchart of FIG. 2, where damping control torque is calculated as a weighted sum of the behavioral deterioration suppressing torque and steering converging torque, and the total steering modification torque Tm are calculated.

In an alternative embodiment of Step 50, DCT is given by:

$$Tdp=(1-K)Tdpn+K \cdot Tdpb \qquad (9)$$

where K is a weight between 0 and 1, which may be determined as a function of DR value and vehicle speed in accordance with a flow chart in FIG. 6A. In this connection, the weight K is 0 at the staring of the control routine of FIG. 2 and as long as a vehicle speed does not exceed its reference value.

Referring to FIG. 6A, first, it is judged if a vehicle speed exceeds the reference value V1 in Step 200. If not, through Step 210 (it is judged if the weight K is larger than 0) and Step 235 while bypassing Steps 215 and 220, DCT is set to Tdpn: Tdp=Tdpn in Step 240.

Figure 6B:
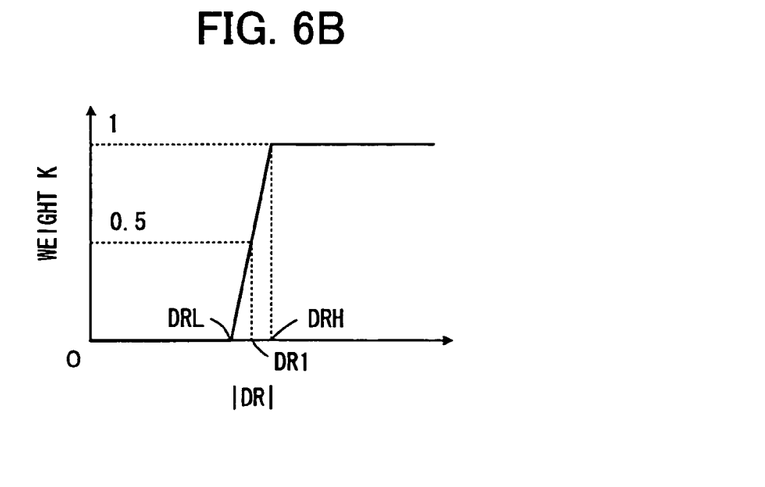
FIG. 6B shows a map of a weight for the steering vs. drift state value DR used in Step 205 in FIG. 6A.

On the other hand, if V exceeds V1, K is determined as a function of the absolute value of DR using a map of FIG. 6B. As seen from the map, K increases from 0 to 1 with |DR|, in which K is equal to 0.5 at |DR|=DR1. When |DR| exceeds DRH, K is set to 1. Accordingly, in Step 240, Tdp is given by:

$$\begin{aligned} Tdp &= Tdpn & \text{if } |DR| < DRL \\ Tdp &= (1-K)Tdpn + K \cdot Tdpb & \text{if } DRL \leq |DR| \leq DRH \\ Tdp &= Tdpb & \text{if } DRH < |DR|. \end{aligned} \qquad (10)$$

It is considered that the vehicle behavior is fallen into deteriorated conditions when |DR| exceeds DR1. Thus, as seen from the expressions (10) and the map of FIG. 6B, the contribution of BDST to TMT becomes higher than the contribution of SCT to TMT when the vehicle behavior is fallen into deteriorated conditions. It should be noted, as long as the vehicle speed exceeds the reference value V1, Tdp is given by the either of expressions (10) so that BDST is smoothly increased and decreased, dependent upon DR value, which is advantageous because the vehicle behavior is more liable to be deteriorated when the vehicle speed is high.

When the vehicle speed reduces below V1 while the weight K exceeds 0 or a certain small value (Steps 200 and 210), it is judged if the following condition is satisfied:

$$|DR| \leq DR2 \text{ and } V \leq V2 \qquad (11)$$

where DR2 and V2 each are appropriately determined positive reference values for DR and V, smaller than D1 and V1 for avoiding control hunting as described in the previous embodiment of FIG. 5. If the condition is not satisfied, DCT is calculated as in the first or second expressions (10). When the condition (11) is satisfied, it is expected that the deterioration has been suppressed. However, as explained about in the previous embodiment, |DR| can be temporally reduced even when the deterioration has not been eliminated. Thus, the weight K is maintained at the level when the condition became satisfied for a predetermined period Tco. Accordingly, in Step 220, it is checked if the elapsed time Tc reaches to Tco, and, if not, Tc is incremented by ΔT (Step 230) and the weight K is set to the value in the previous cycle. After a plurality of cycles, when the elapsed time Tc reaches to Tco (Step 230), the weight K is set to zero: DCT is completely set to SCT for normal conditions.

Then, in step 240, a target value of TMT, Tm, is calculated as $$Tm=Tab+Tdp.$$

Returning to the main routine of FIG. 2, in step S60, the motor is operated in accordance with the resultant target value of TMT, Tm, and the process returns to START.

Accordingly, since the weights of SCT and BDST in DCT is appropriately regulated depending upon the vehicle running conditions, deterioration of the steering convergency, induced from and increasing behavioral deterioration, is suppressed while ensuring the steering smoothness under normal conditions.

In the calculation of SAT, SCT, BDST and weight K, the maps for determining the values of the parameters can be determined theoretically and experimentally by one of ordinary skill in the art. Programs and all data of the maps for the control routine may be stored in the controllers 20 or memories attached therewith.

Although the present invention has been described in detail with respect to preferred embodiments thereof and some partial modifications thereof, it will be apparent for those skilled in the art that other various modifications are possible with respect to the shown embodiments within the scope of the present invention.

The invention claimed is:

1. A device for controlling electrically-driven power steering apparatus of a vehicle, the device calculating a target value of steering assist torque based upon at least steering torque; calculating a target value of steering converging torque based upon at least a steering velocity; calculating a target value of total modification torque to be generated with the power steering apparatus based upon at least the target values of the steering assist torque and steering converging torque; and controlling the power steering apparatus based upon the target total modification torque; characterized in that the device further calculates a target value of behavioral deterioration-suppressing torque for suppressing steering causing a vehicle behavioral deterioration when the vehicle falls into oversteered or understeered conditions, and renders a degree of contribution of the target value of the behavioral deterioration-suppressing torque to the target value of the total modification torque higher than a degree of contribution of the target value of the steering converging torque to the target value of the total modification torque when a predetermined condition is satisfied.

2. A device of claim 1, wherein a magnitude of the target behavioral deterioration-suppressing torque value is set larger than a magnitude of the target steering converging torque value.

3. A device of claim 1, wherein said predetermined condition is judged satisfied when an indication value indicating a degree of behavior deterioration of the vehicle exceeds a reference value.

4. A device of claim 1, wherein said predetermined condition is judged satisfied when the indication value exceeds the reference value under condition that a vehicle speed exceeds a speed reference value.

5. A device of claim 1, wherein the target total modification torque value is calculated based upon the target values of the steering assist torque and steering converging torque when the predetermined condition is not satisfied; and the target total modification torque value is calculated based upon the target values of the steering assist torque and behavioral deterioration-suppressing torque when the predetermined condition is satisfied.

6. A device of claim 1, wherein the degree of contribution of the target value of the behavioral deterioration-suppressing torque to the target value of the total modification torque is kept higher than the degree of contribution of the target value of the steering converging torque to the target value of the total modification torque for a predetermined period after the predetermined condition is turned unsatisfied.

7. A device of claim 3, wherein the indication value is an indication value indicating a degree of oversteered condition or understeered condition of the vehicle.

8. A device of claim 7, wherein the reference value for the indication value is set such that the indication value exceeds the reference value simultaneously with or prior to the starting of behavioral control through controlling braking and driving force on wheels of the vehicle.

9. A device of claim 1, wherein the target value of the behavioral deterioration-suppressing torque is calculated based upon a steering velocity and a vehicle speed.

10. A device of claim 9, wherein the magnitude of the target behavioral deterioration-suppressing torque value when the magnitude of the steering velocity is high is calculated to be rendered larger than when the steering velocity is lower.

11. A device of claim 9, wherein the magnitude of the target behavioral deterioration-suppressing torque value when the vehicle speed is high is calculated to be rendered larger than when the vehicle is lower.

* * * * *